United States Patent

Schmitt

[19]

[11] Patent Number: 6,102,493
[45] Date of Patent: Aug. 15, 2000

[54] APPARATUS AND METHOD OF OPERATION FOR A VEHICLE ANTI-LOCK BRAKE SYSTEM

[75] Inventor: Hubert E. Schmitt, Ochtendung, Germany

[73] Assignee: Lucas Varity GmbH, Koblenz, Germany

[21] Appl. No.: 09/112,311

[22] Filed: Jul. 9, 1998

[30] Foreign Application Priority Data

Jul. 10, 1997 [DE] Germany ............................ 197 29 576

[51] Int. Cl.⁷ .................................................. B60T 8/48
[52] U.S. Cl. ............................... 303/116.1; 303/115.4; 303/119.1
[58] Field of Search ........................ 303/116.1, 116.2, 303/116.3, 10, 116.4, 113.1, 115.4, 115.5, 11–12, 900, 901, 119.1, 113.2, 68–69, 140, 146, 147, 139, 148, 155–159

[56] References Cited

U.S. PATENT DOCUMENTS

| | | | |
|---|---|---|---|
| 4,875,741 | 10/1989 | Ozawa et al. ......................... | 303/116.4 |
| 4,969,696 | 11/1990 | Yogo et al. ............................ | 303/189 |
| 5,211,454 | 5/1993 | Schaefer et al. .................... | 303/119.1 |
| 5,246,280 | 9/1993 | Sigl ....................................... | 303/119.1 |
| 5,441,336 | 8/1995 | Takeuchi ............................. | 303/119.1 |
| 5,743,601 | 4/1998 | Mori et al. .......................... | 303/116.1 |
| 5,876,101 | 3/1999 | Taniguchi et al. .................. | 303/189 |
| 5,967,625 | 10/1999 | Reuter et al. ........................ | 303/116.1 |

FOREIGN PATENT DOCUMENTS

| | | |
|---|---|---|
| 36 31 442 A1 | 3/1988 | Germany . |
| 44 05 918 A1 | 8/1995 | Germany . |
| 44 45 512 A1 | 8/1995 | Germany . |
| 195 42 014 A1 | 5/1996 | Germany . |

Primary Examiner—Douglas C. Butler
Attorney, Agent, or Firm—MacMillan, Sobanski & Todd, LLC

[57] ABSTRACT

An antilock system for a motor vehicle braking system which includes a master cylinder which is connected with a brake fluid reservoir and which can be activated by a brake pedal in order to deliver brake fluid through a connecting line into at least one wheel brake cylinder. The system also includes an electromagnetic valve is arranged in the connecting line between the master cylinder and the wheel brake cylinder in order to establish or to interrupt the connection by an electronic control unit. The system further includes a fluid pump arranged in parallel to the electronic valve in order to remove brake fluid from the wheel brake cylinder, with the fluid pump being operable to deliver fluid in one direction and being shut off to block fluid flow in the other direction.

10 Claims, 3 Drawing Sheets

APPARATUS AND METHOD OF OPERATION FOR A VEHICLE ANTI-LOCK BRAKE SYSTEM

BACKGROUND OF THE INVENTION

This invention relates in general to vehicle brake systems and in particular to an anti-lock brake system.

An anti-lock brake system is often included as standard equipment on new vehicles. When actuated, the anti-lock brake system is operative to control the operation of some or all of the vehicle wheel brakes. A typical anti-lock brake system includes a plurality of normally open and normally closed solenoid valves which are mounted within a control valve body and connected to the vehicle hydraulic brake system. Usually, a separate hydraulic source, such as a motor driven pump, is included in the anti-lock brake system for reapplying hydraulic pressure to the controlled wheel brakes during an anti-lock brake system braking cycle.

An anti-lock brake system further includes an electronic control module which has a microprocessor. The control module is electrically coupled to the pump motor, a plurality of solenoid coils associated with the solenoid valves and wheel speed sensors for monitoring the speed and deceleration of the controlled wheels. The control module is typically mounted upon the control valve body to form a compact unit.

During vehicle operation, the microprocessor in the anti-lock brake system control module continuously receives speed signals from the wheel speed sensors. The microprocessor monitors the wheel speed signals for a potential wheel lock-up condition. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

SUMMARY OF THE INVENTION

The present invention relates to an antilock system for a vehicle braking system of a motor vehicle and to a method for the operation of the antilock system.

In particular, the invention relates to an antilock system for a vehicle braking system of a motor vehicle. comprising a master cylinder which is connected with a brake fluid reservoir and which can be actuated via a brake pedal in order to deliver brake fluid through a connecting line to at least one wheel brake cylinder, wherein an electromagnetic valve is arranged in the connecting line between the master cylinder and the wheel brake cylinder in order to establish or to interrupt the connection by means of an electronic control unit in a controlled manner, and wherein a fluid pump is arranged in parallel to the/to each electromagnetic valve in order to remove brake fluid from the wheel brake cylinder, with the fluid pump being adapted to deliver in only one direction and to shut off in the other direction.

The state of the art as is employed, in particular, for cost optimised antilock systems (see e.g. DE 44 03 445 A1) does not provide for an individual pressure regulation of all wheels of a motor vehicle.

For the wheel-specific pressure regulation as is shown by way of the example of FIG. 1 a very high number of components (valves, expander chambers, gating electronics in the electronic control unit, as well as electromagnet arrangements for the valves) is required.

The invention is therefore based on the object to provide a vehicle braking system with an antilock system, in which the above described drawbacks can be overcome using fewer components. This object is solved by means of the initially described vehicle braking system with an antilock system.

For this purpose, the invention takes advantage of the findings that a vehicle braking system with an antilock system can be provided which comprises a considerably smaller number of the above mentioned components if a separate fluid pump is provided for each wheel or for each wheel brake cylinder, respectively, or for each group of wheel brake cylinders to be controlled together.

In an embodiment of the inventive antilock system each wheel brake cylinder is assigned an electromagnetic valve and a fluid pump.

In another embodiment of the inventive antilock system the wheel brake cylinders of one axle (preferably of the rear axle) of the motor vehicle are assigned a common electromagnetic valve and a fluid pump.

In both embodiments, a non-return valve is preferably connected in parallel with each electromagnetic valve, which allows brake fluid to be drained off the wheel brake cylinder in the case of a pressure difference between the respective wheel brake cylinder and the master cylinder. This improves safety because an afterbraking operation is avoided when the driver releases the actuation of the brake pedal during an antilock braking operation. Moreover, the non-return valve permits the use of a less sophisticated fluid pump.

In the inventive antilock system preferably at least two of the fluid pumps can be driven by a common motor, preferably an electric motor, with the speed of the electric motor being controlled by the electronic control unit (ECU). In particularly preferred embodiments all fluid pumps can be driven together by a single electric motor in that they are all coupled with its drive shaft. Whether the coupling is effected rigidly or via an overload coupling depends on the design of the respective fluid pumps (for example vane-type pump, positive displacement pump).

In a first embodiment of the inventive vehicle braking system with antilock system, a wheel brake cylinder of the front axle at a first side of the motor vehicle has an at least sectionwise common connecting line to the master cylinder with a wheel brake cylinder of the rear axle at a second side of the motor vehicle, and the wheel brake cylinder of the front axle at the second side of the motor vehicle has an at least sectionwise common connecting line to the master cylinder with the wheel brake cylinder of the rear axle at the first side of the motor vehicle. Thereby, a so-called diagonally split vehicle braking system is created.

Alternatively, the two wheel brake cylinders of the front axle of the motor vehicle have an at least sectionwise common connecting line to the master cylinder, and the wheel brake cylinders of the rear axle of the motor vehicle have an at least sectionwise common connecting line to the master cylinder. Thereby, a so-called vertically split vehicle braking system is created.

In a particularly simple embodiment of the inventive vehicle braking system with antilock system, the two wheel brake cylinders of the rear axle of the motor vehicle can be connected with or interrupted from the master cylinder via a common electromagnetic valve, with a non-return valve and a fluid pump being preferably connected in parallel with said electromagnetic valve. Thus the two wheel brake cylinders of the rear axle are only controllable together in the antilock mode. In view of the "select low principle", however, this is quite justifiable for stability reasons.

The invention also relates to a method for the operation of the above described antilock systems, wherein the operating positions normal braking, controlled pressure build-up, controlled pressure relief, and controlled pressure holding are effected by control signals which are supplied by the electronic control unit to the electromagnetic valves and/or the fluid pump.

In the operating position "normal braking", in particular, the electronic control unit (ECU) does not supply control signals to the electromagnetic valves and/or the fluid pump. Rather, the components are designed in such a manner that the operating position "normal braking" is fully functional even when the antilock system does not function. For this purpose, the inventive connection of the components ensures that the electromagnetic valves are in their forward position in their currentless condition and an activation of the fluid pump is not necessary for the operating position "normal braking".

In the operating position "controlled pressure build-up" of the antilock mode the electronic control unit (ECU) places the respective electromagnetic valve in its forward position, and upon actuation of the brake pedal the brake fluid then flows from the master cylinder into the respective wheel brake cylinder(s).

In the operating position "controlled pressure build-up" of the antilock mode the fluid pump may short-circuit deliver fluid. This, however, need not be the case. Rather, the fluid is delivered virtually short-circuited through the electromagnetic valve. However, this permits the fluid pump to be operated for other wheel brake cylinders of the motor vehicle.

In the operating position "controlled pressure relief" of the antilock mode the electronic control unit (ECU) places the respective electromagnetic valve into its shut-off position and activates the fluid pump so that brake fluid from the respective wheel brake cylinder(s) flows into the master cylinder or into the remaining brake circuit.

In the operating position "controlled pressure holding" of the antilock mode the electronic control unit (ECU) places the respective electromagnetic valve into its shut-off position and does not activate the fluid pump so that no brake fluid from the respective wheel brake cylinder(s) can flow into the master cylinder or into the remaining brake circuit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
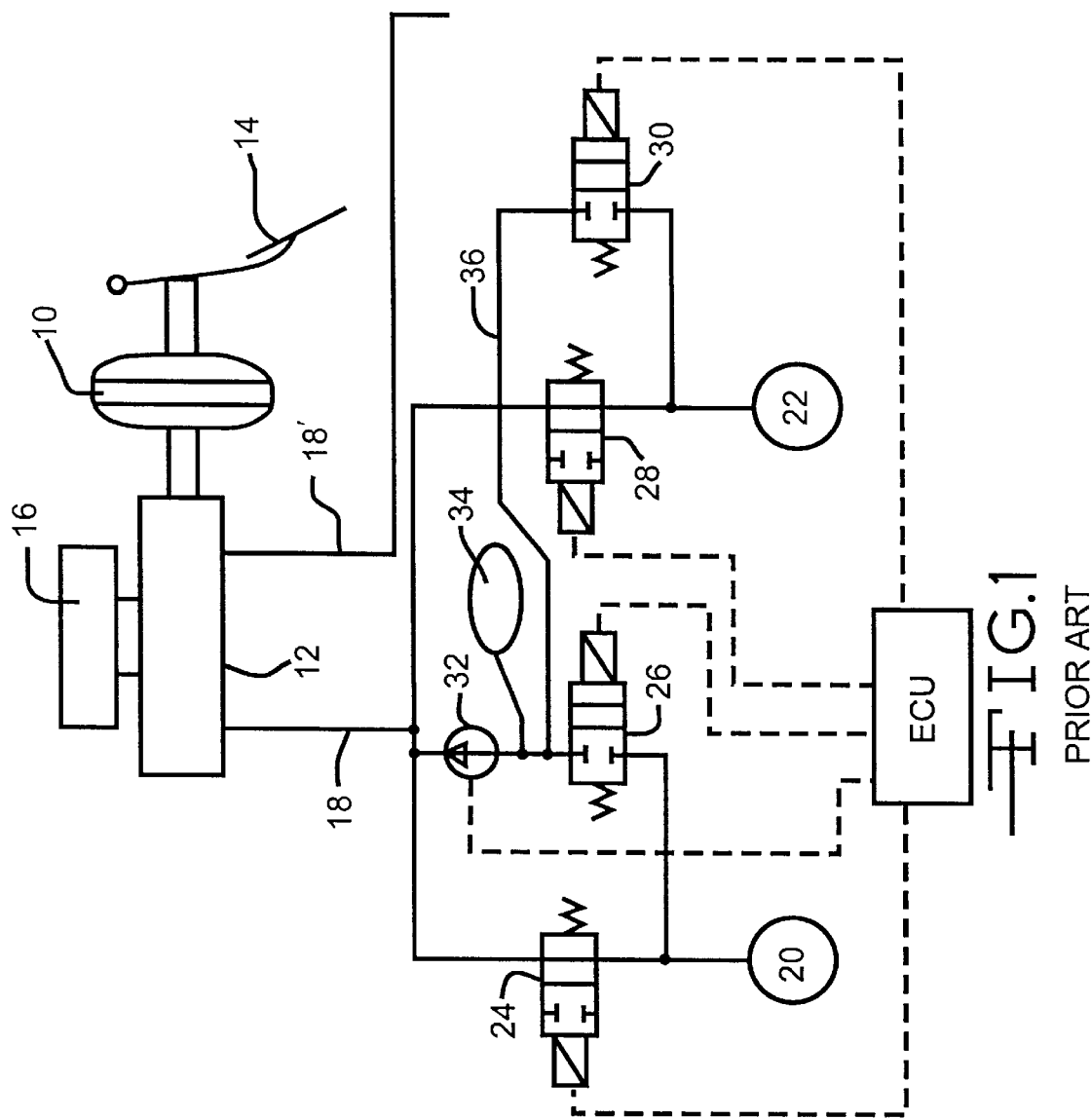
FIG. 1 shows a vehicle braking system with antilock system according to the state of the art.

FIG. 1 shows a vehicle braking system with antilock system according to the state of the art, comprising a brake booster 10 which is coupled with a master cylinder 12. The brake booster 10—and thus the master cylinder 12—can be activated by a brake pedal 14. The master cylinder 12 is connected with a brake fluid reservoir 16. Upon an actuation of the brake pedal 14 brake fluid is delivered through a connecting line 18 into at least one wheel brake cylinder 20, 22. The drawing shows the connection of two wheel brake cylinders only (e.g. front left, and rear right). The two wheel brake cylinders which are not shown (e.g. rear left, and front right) are connected in a corresponding manner with the master cylinder 12 via the connecting line 18'.

Electromagnetic valves 24, 26 and 28, 30, respectively, are arranged in the connecting line 18 between the master cylinder 12 and each of the wheel brake cylinders 20, 22, in order to establish or to interrupt the connection between the master cylinder 12 and each of the wheel brake cylinders 20, 22 in a controlled manner by means of an electronic control unit (ECU).

The one electromagnetic valve 24, 28 for each wheel brake cylinder 20, 22 in its spring-loaded neutral position is in forward position, and the corresponding other electromagnetic valve 26, 30 for each wheel brake cylinder 20, 22, which is connected in parallel to same, in its spring-loaded neutral position is in its shut-off position. A fluid pump 32 is connected in series with the electromagnetic valve 26 being in its shut-off neutral position of the first wheel brake cylinder 20, with an expander chamber 34 and a fluid line 36 which leads to the electromagnetic valve 30 being in its shut-off neutral position of the second wheel brake cylinder 22 being connected between the fluid pump 32 and the electromagnetic valve 26.

As can be seen, a fluid pump 32, an expander chamber 34, four 2/2-way electromagnetic valves, the output stages required therefor in the electronic control unit (ECU), as well as the electromagnet arrangements at the electromagnetic valves are provided for each wheel brake cylinder pair.

Figure 2:
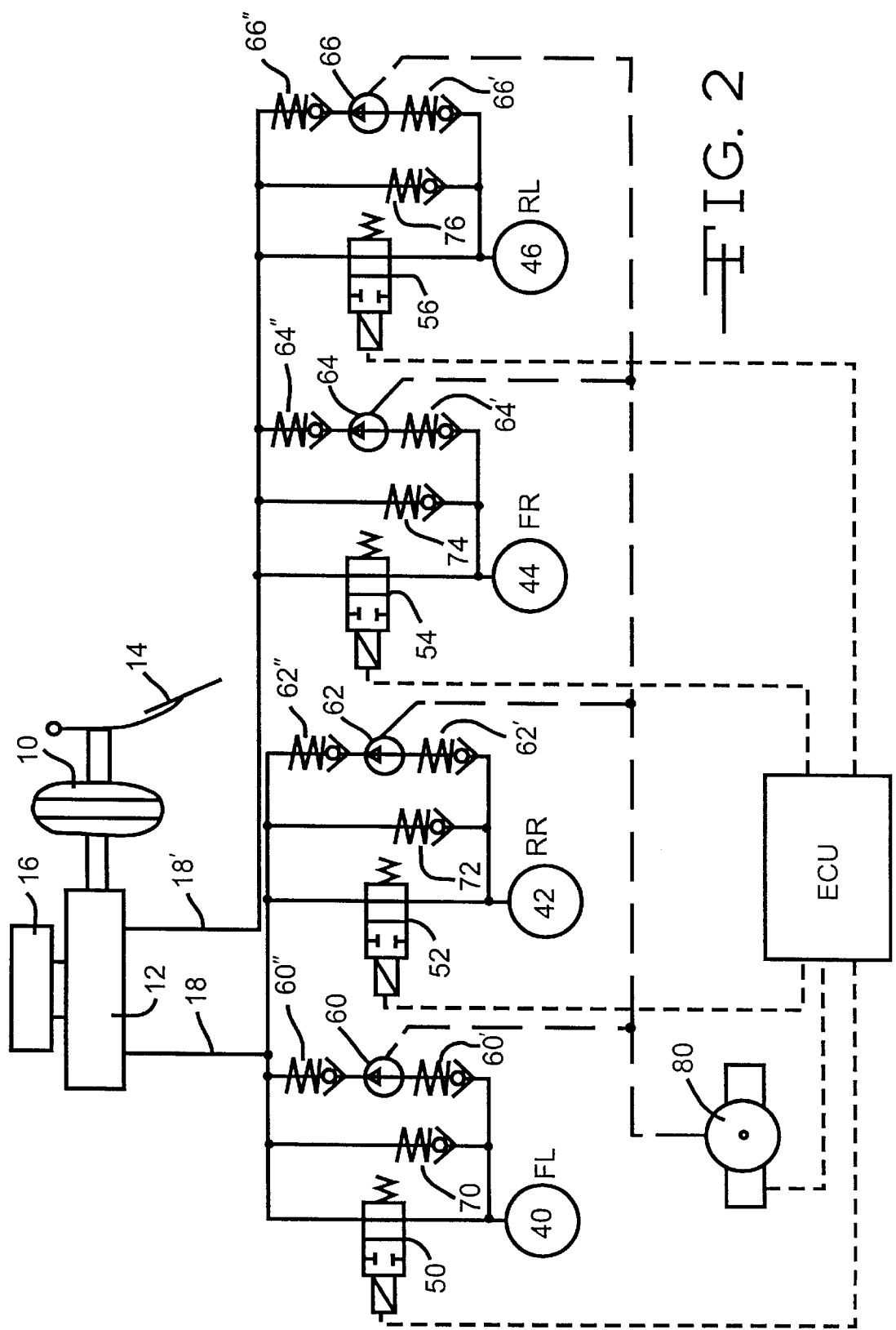
FIG. 2 shows a first embodiment of an inventive vehicle braking system with antilock system.

FIG. 2 shows a first embodiment of an inventive vehicle braking system with antilock system, wherein components with the same or an equivalent function or effect as the components in FIG. 1 are assigned the same reference numerals.

The master cylinder 12 is connected with the brake fluid reservoir 16 and can be activated via a brake pedal 14 in order to deliver brake fluid into the respective wheel brake cylinders 40, 42, 44, 46 via the connecting line(s) 18, 18'. In the connecting line 18, 18' between the master cylinder 12 and each wheel brake cylinder 40, 42, 44, 46 an electromagnetic valve 50, 52, 54, 56 each is arranged in order to establish or to interrupt the connection between the respective wheel brake cylinder 40, 42, 44, 46 and the master cylinder 12 in a controlled manner by means of an electronic control unit (ECU). A fluid pump 60, 62, 64, 66 each is arranged in parallel to the/to each electromagnetic valve 50, 52, 54, 56 in order to convey brake fluid from the respective wheel brake cylinder 40, 42, 44, 46. Each of the fluid pumps 60, 62, 64, 66 is adapted to deliver in one direction only (from the wheel brake cylinder toward the master cylinder) and to be shut off in the other direction. For this purpose one valve 60', 60"; 62', 62"; 64', 64"; 66', 66" each is arranged upstream and downstream of each fluid pump 60, 62, 64, 66 which can only be passed in one direction and which is shut off in the other direction. These valves 60', 60"; 62', 62"; 64', 64"; 66', 66" can also be integrated in the respective fluid pump 60, 62, 64, 66. Otherwise, each of the fluid pumps 60, 62, 64, 66 is self-locking and also self-priming.

A pressure differential valve 70, 72, 74, 76 is connected in parallel with each electromagnetic valve 50, 52, 54, 56, which allows brake fluid to be drained from the wheel brake cylinder 40, 42, 44, 46 in the case of an overpressure at/in the respective wheel brake cylinder 40, 42, 44, 46 or, respectively, in the case of a differential pressure between the respective wheel brake cylinder and the master cylinder.

All of the four fluid pumps 60, 62, 64, 66 can be driven by a common electric motor 80, with the speed of the electric motor 80 being controlled by the electronic control unit (ECU). In this manner it is possible to specify the delivery per time unit of each of the four fluid pumps 60, 62, 64, 66.

In the embodiment according to FIG. 2 a wheel brake cylinder 40 (VL) of the front axle on a first side of the motor vehicle and a wheel brake cylinder 42 (HR) of the rear axle at a second side of the motor vehicle share the connecting line 18 to the master cylinder in a sectionwise manner. Likewise, the wheel brake cylinder 44 (VR) of the front axle at the second side of the motor vehicle and the wheel brake cylinder 46 (HL) of the rear axle at the first side of the motor vehicle share the connecting line 18' to the master cylinder 12.

In the following the operation of the inventive vehicle braking system with antilock system will be explained with reference to FIG. 2.

In a vehicle braking system with antilock system there are four different operating positions "normal braking", "controlled pressure build-up", "controlled pressure relief", and "controlled pressure holding". These four operating positions are effected by means of control signals which are supplied to the electromagnetic valves 50, 52, 54, 56 and/or to the electric motor 80 of the fluid pumps 60, 62, 64, 66 by the electronic control unit (ECU).

In the operating position "normal braking" the electronic control unit (ECU) does not supply control signals to the electromagnetic valves or to the fluid pump. The electromagnetic valves are therefore in their neutral position (forward) and the fluid pumps do not operate. Upon an actuation of the brake pedal 14 brake fluid from the reservoir 16 is forced through the master cylinder 12 into the lines 18, 18', passed through the electromagnetic valves 50, 52, 54, 56 and forced into the wheel brake cylinders 40, 42, 44, 46. Upon releasing the brake pedal 14 the brake fluid returns in the reverse direction.

In the operating position "controlled pressure build-up" in the antilock mode the electronic control unit (ECU)—depending on signals from wheel speed sensors (not shown)—places the respective electromagnetic valve 50, 52, 54, 56 into its forward position. Due to the fact that the antilock mode can nevertheless only be initiated with the brake pedal 14 actuated the invention takes advantage of this circumstance, and, with the brake pedal 14 actuated, brake fluid from the master cylinder 12 is forced into the respective wheel brake cylinder(s) 40, 42, 44, 46.

If the fluid pump or the electric motor 80, respectively, has to be activated due to different operating condition requirements at other wheels (e.g. "controlled pressure relief", see below), this is of no significance for individual wheel brake cylinders because the fluid pump associated with this respective wheel brake cylinder can short-circuit deliver the brake fluid in the operating position "controlled pressure buildup".

In the operating position "controlled pressure relief" the electronic control unit (ECU) places the respective electromagnetic valve into its shut-off position and activates the fluid pump so that brake fluid from the respective wheel brake cylinder(s) flows into the master cylinder or into the remaining brake circuit.

In the operating position "controlled pressure holding" the electronic control unit (ECU) places the respective electromagnetic valve into its shut-off position and does not activate the fluid pump so that no brake fluid from the respective wheel brake cylinder(s) can flow into the master cylinder or into the remaining brake circuit.

Figure 3:
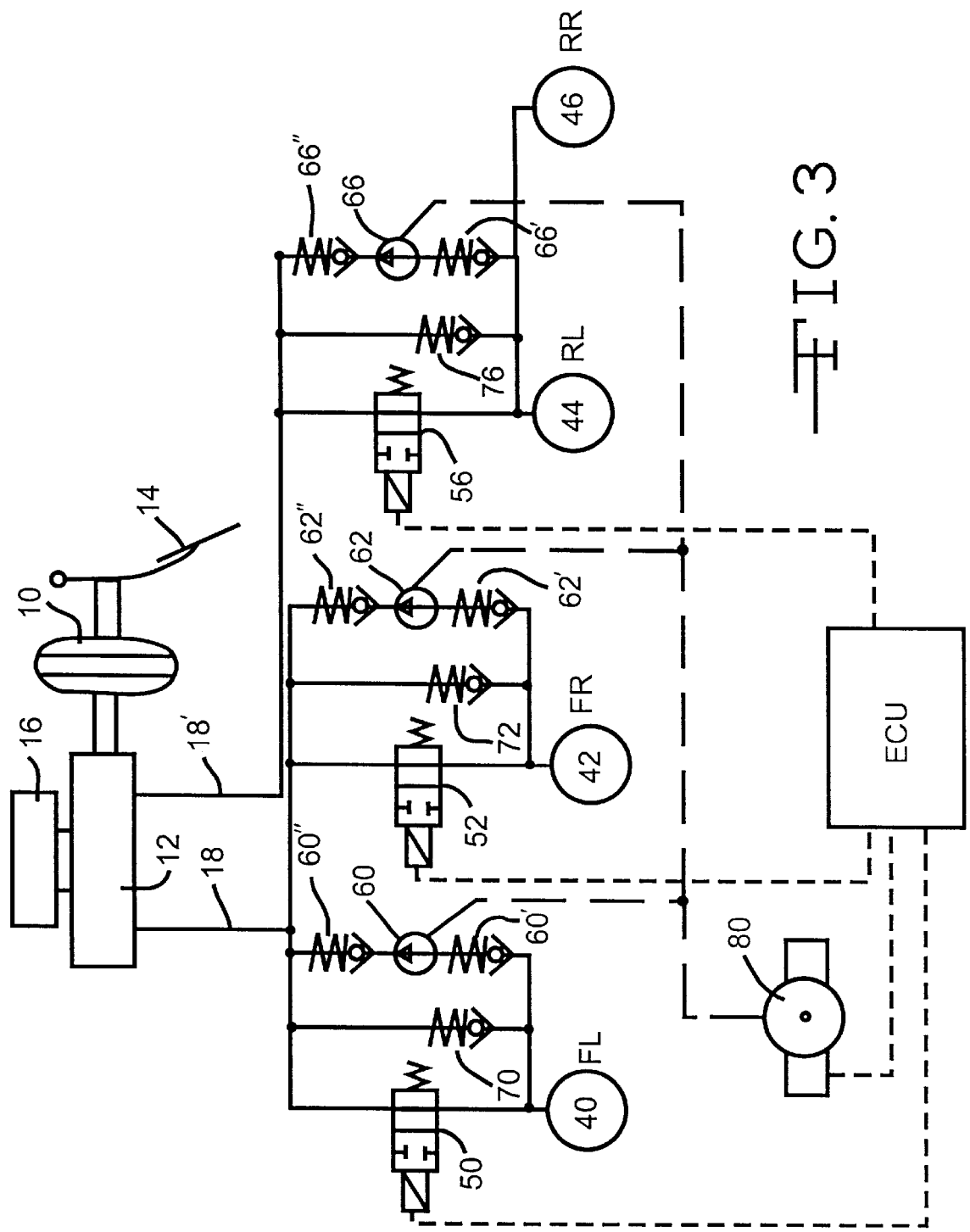
FIG. 3 shows a second embodiment of an inventive vehicle braking system with antilock system.

The embodiment according to FIG. 3 differs from that according to FIG. 2 insofar as a common electromagnetic valve 54 and a fluid pump 64 is associated with the wheel brake cylinders of an axle of the motor vehicle (preferably of the rear axle). In other words, the two wheel brake cylinders 44, 46 of the rear axle of the motor vehicle can be connected with or interrupted from the master cylinder 12 by means of a common electromagnetic valve 54, with a non-return valve 74 and a fluid pump 64 being connected in parallel with this electromagnetic valve 54. Principally, it is, however, also possible to apply this concept of a common control to the front axle.

Thus, the two wheel brake cylinders 40, 42 of the front axle of the motor vehicle have a sectionwise common connecting line 18 to the master cylinder 12, and the two wheel brake cylinders 44, 46 of the front axle of the motor vehicle have a sectionwise common connecting line 18' to the master cylinder 12.

Otherwise, the operation of the embodiment according to FIG. 3 does not differ from that according to FIG. 2.

It is obvious that the inventive arrangement enables a considerable portion of the components as are required in the state of the art, to be saved, at the same time also enabling a wheel-specific antilock mode. In the cooperation with the inventive fluid pump(s) or their arrangement in the system, this effect can be achieved by employing fewer 2/2-way electromagnetic valves.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An anti-lock brake system for a motor vehicle having a master cylinder which is connected with a brake fluid reservoir and which can be activated by means of a brake pedal in order to deliver brake fluid through a connecting line into at least one wheel brake cylinder, the anti-lock system comprising:

an electromagnetic valve arranged in the connecting line between the master cylinder and the wheel brake cylinder in order to establish or interrupt the connection;

an electronic control unit connected to said electromagnetic valve, said electronic control unit operable to cause said valve to establish or to interrupt said connection; and a fluid pump arranged in parallel to said electromagnetic valve in order to remove brake fluid from said wheel brake cylinder, with said fluid pump being adapted to deliver in only one direction and to shut off in the other direction, said fluid pump connected to said electronic control unit, said electronic control unit being operable to selectively actuate said fluid pump and said electronic valve, said electronic control unit having a first controlled pressure build-up mode of operation during which the brake pedal is actuated to supply pressurized brake fluid from the master cylinder and said control unit is operative to actuate said electromagnetic valve to allow a portion of said pressurized brake fluid to the brake cylinder and a second controlled pressure build-up mode of operation during which said fluid pump is activated to short circuit said flow of pressurized brake fluid to the brake cylinder, said electronic control mode also having a controlled pressure holding mode of operation during which said electromagnetic valve is closed and said fluid pump is not activated so that no brake fluid can flow between the master cylinder and said brake cylinder.

2. The antilock system according to claim 1, wherein the vehicle brake system includes a plurality of wheel brake cylinders and further wherein the anti-lock brake system includes a plurality of electromagnetic valves and fluid pumps with each of said wheel brake cylinders being assigned an electromagnetic valve and a fluid pump.

3. The antilock system according to claim 2, wherein the wheel brake cylinders of one axle of the motor vehicle are assigned a common electromagnetic valve and a fluid pump.

4. The antilock system according to claim 3, wherein a non-return valve is connected in parallel with each electromagnetic valve, said non-return valves allowing brake fluid to be drained from said wheel brake cylinders in the case of an overpressure in an associated wheel brake cylinder.

5. The antilock system according to claim 2, wherein at least two of said fluid pumps can be driven by a common electric motor with the speed of said electric motor being controlled by said electronic control unit.

6. The antilock system according to claim 2, wherein said wheel brake cylinder of the front axle at a first side of the motor vehicle and said wheel brake cylinder of the rear axle at a second side of the motor vehicle share, at least sectionwise, a first connecting line to the master cylinder, and further wherein said wheel brake cylinder of the front axle at the second side of the motor vehicle and said wheel brake cylinder of the rear axle at the first side of the motor vehicle share, at least sectionwise, second connecting line to the master cylinder.

7. The antilock system according to one of claim 2, wherein said two wheel brake cylinders of the front axle of the motor vehicle share, at least sectionwise, a common connecting line to the master cylinder, and said wheel brake cylinders of the rear axle of the motor vehicle share, at least sectionwise, a common connecting line to the master cylinder.

8. The antilock system according to claim 7, wherein said two wheel brake cylinders of the rear axle of the motor vehicle can be connected with or disconnected from the master cylinder by means of a common electromagnetic valve, with a non-return valve and a fluid pump being connected in parallel with said electromagnetic valve.

9. The anti-lock brake system according to claim 1 wherein said electronic control unit has a normal braking mode of operation during which said control unit does not send any control signals to said electromagnetic valve and said fluid pump.

10. The anti-lock brake system according to claim 1 wherein said electronic control unit has a controlled pressure relief mode of operation during which said electromagnetic valve is closed and said fluid pump is actuated so that brake fluid flows from the brake cylinder into the master cylinder.

* * * * *

UNITED STATES PATENT AND TRADEMARK OFFICE
CERTIFICATE OF CORRECTION

PATENT NO. : 6,102,493
DATED : August 15, 2000
INVENTOR(S) : Hubert E. Schmitt

It is certified that error appears in the above-identified patent and that said Letters Patent are hereby corrected as shown below:

| | |
|---|---|
| Column 6, Claim 1, Line 5, | after " anti-lock", insert --brake--. |
| Column 6, Claim 1, Line 9 | after "establish or ", insert --to--. |
| Column 6, Claim 1, Line 12, | after "cause said", insert --electromagnetic--. |
| Column 6, Claim 1, Line 20, | replace "electronic" with --electromagnetic--. |
| Column 6, Claim 1, Line 26, | after "fluid to", insert --flow to--. |

Signed and Sealed this

First Day of May, 2001

*Attest:*

NICHOLAS P. GODICI

*Attesting Officer*  *Acting Director of the United States Patent and Trademark Office*